US010492550B2

(12) United States Patent
Blakely et al.

(10) Patent No.: US 10,492,550 B2
(45) Date of Patent: Dec. 3, 2019

(54) ARTICLE OF APPAREL INCLUDING THERMOREGULATORY TEXTILE

(71) Applicant: Under Armour, Inc., Baltimore, MD (US)

(72) Inventors: Kyle S. Blakely, Baltimore, MD (US); Neal Goldman, Baltimore, MD (US)

(73) Assignee: Under Armour, Inc., Baltimore, MD (US)

( * ) Notice: Subject to any disclaimer, the term of this patent is extended or adjusted under 35 U.S.C. 154(b) by 654 days.

(21) Appl. No.: 14/607,318

(22) Filed: Jan. 28, 2015

(65) Prior Publication Data

US 2015/0223533 A1  Aug. 13, 2015

Related U.S. Application Data

(60) Provisional application No. 61/932,480, filed on Jan. 28, 2014.

(51) Int. Cl.
*A41D 31/06* (2019.01)
*D06M 11/74* (2006.01)
(Continued)

(52) U.S. Cl.
CPC ............... *A41D 31/06* (2019.02); *B32B 3/10* (2013.01); *B32B 5/142* (2013.01); *D04B 1/02* (2013.01);
(Continued)

(58) Field of Classification Search
CPC ............ A41D 31/0033; A41D 31/0038; A41D 31/00; A41D 13/005; A41D 13/0015;
(Continued)

(56) References Cited

U.S. PATENT DOCUMENTS 2,695,895 A     11/1954  Barnard et al.
3,422,512 A  *   1/1969  Law .................. B41F 15/12
                                                    26/16
(Continued)

FOREIGN PATENT DOCUMENTS

CN          1094928       11/1994
CN          2484763        4/2002
(Continued)

OTHER PUBLICATIONS

Subramanian, Muralisrinivasan Natamai. (2016). Plastics Waste Management—Processing and Disposal—2.1.1.2 Polypropylene. Smithers Rapra Technology. Online version available at:http://app.knovel.com/hotlink/pdf/id:kt011129JVG/plastics-waste-management/polypropylene.*

(Continued)

*Primary Examiner* — Laura C Powers
*Assistant Examiner* — Larissa E Rowe
(74) *Attorney, Agent, or Firm* — Maginot, Moore & Beck LLP

(57) ABSTRACT

A process of forming a textile and apparel formed utilizing the textile is disclosed. The textile includes a base layer and a spacer layer defined by a plurality of bosses extending from the base layer. In an embodiment, the bosses are oriented in a grid pattern, being spaced apart to define gaps for air circulation. Selected bosses are mechanically compressed and secured in the compressed state utilizing an adhesive composition. The adhesive composition may further include heat insulating or heat reflective particles. The resulting textile may be utilized to form articles of apparel, including garments such as shirts, pants, coats, and footwear.

17 Claims, 10 Drawing Sheets

(51) Int. Cl.
| | |
|---|---|
| *D06M 11/44* | (2006.01) |
| *B32B 5/14* | (2006.01) |
| *D06M 11/46* | (2006.01) |
| *D04B 21/02* | (2006.01) |
| *D04B 1/02* | (2006.01) |
| *D06M 11/77* | (2006.01) |
| *B32B 3/10* | (2006.01) |
| *D06M 11/45* | (2006.01) |
| *A41D 31/102* | (2019.01) |

(52) U.S. Cl.
CPC ............ *D04B 21/02* (2013.01); *D06M 11/44* (2013.01); *D06M 11/45* (2013.01); *D06M 11/46* (2013.01); *D06M 11/74* (2013.01); *D06M 11/77* (2013.01); *Y10T 428/2481* (2015.01)

(58) Field of Classification Search
CPC ............ A41D 2400/22; A41D 2400/60; A41D 2400/62; A41D 2400/20; A41D 2400/10–22; A41D 31/06; A41D 31/102; Y10T 428/2481; Y10T 428/12396; Y10T 156/1737; Y10T 428/24041; Y10T 428/24793; Y10T 428/1362; Y10T 428/23914–23993; Y10T 428/24355–24388; Y10T 428/24421; Y10T 428/428; Y10T 428/24752–2476; Y10T 428/24802–24826; Y10T 428/24843–24851; Y10T 428/24876; Y10T 428/24893; Y10T 428/2495; Y10T 442/2139; Y10T 442/2213; Y10T 442/2402; Y10T 442/2484; Y10T 442/2631; B41M 1/10; B41M 1/24; A47L 13/00; A47L 13/16; D21H 19/66; D21H 19/68; Y10S 148/91; D10B 2401/021; D10B 2501/04; D10B 2403/011–0111; D10B 2403/024–0241; D10B 2403/0242–0243; D10B 501/04; B32B 3/10; B32B 5/026; B32B 5/142; B32B 5/147–16; B32B 7/045; B32B 7/12–14; B32B 33/00; B32B 2255/02; B32B 2307/30–306; D03D 27/00–18; D04B 1/02–04; D04B 21/02–04; D06C 23/00–04; D06C 2700/31; D05C 17/026; D06Q 1/06; D06M 1/44–46; D06M 1/74; D06M 1/07
USPC .................. 428/85–97, 141–145, 189–190, 428/195.1–198, 200–201, 204, 206, 213, 428/102–104, 148–149, 166–168, 209; 442/76, 85, 108, 118, 136, 74–75, 442/131–133, 316–317; 28/252; 139/391–406; 427/256, 271, 275, 286
See application file for complete search history.

(56) References Cited

U.S. PATENT DOCUMENTS

| | | | |
|---|---|---|---|
| 3,849,802 A | 11/1974 | Govaars | |
| 4,211,261 A | 7/1980 | Mehta et al. | |
| 4,316,931 A | 2/1982 | Tischer et al. | |
| 4,420,521 A | 12/1983 | Carr | |
| 4,569,874 A | 2/1986 | Kuznetz | |
| 4,622,253 A | 11/1986 | Levy | |
| 4,637,947 A | 1/1987 | Maekawa et al. | |
| 4,856,294 A | 8/1989 | Scaringe et al. | |
| 5,072,455 A | 12/1991 | St. Ours | |
| 5,073,222 A | 12/1991 | Fry | |
| 5,098,795 A | 4/1992 | Webb et al. | |
| 5,265,278 A | 11/1993 | Watanabe | |
| 5,411,791 A | 5/1995 | Forry et al. | |
| 5,792,714 A | 8/1998 | Schindler et al. | |
| 6,007,245 A | 12/1999 | Looy | |
| 6,089,194 A | 7/2000 | LaBelle | |
| 6,219,852 B1 | 4/2001 | Bain et al. | |
| 6,284,380 B1* | 9/2001 | Martin | D21F 1/0027 139/383 A |
| 6,321,386 B1 | 11/2001 | Monica | |
| 6,332,221 B1 | 12/2001 | Gracey | |
| 6,415,453 B1 | 7/2002 | Anderson et al. | |
| 6,599,850 B1 | 7/2003 | Heifetz | |
| 6,824,819 B2 | 11/2004 | Vogt et al. | |
| 6,931,665 B2* | 8/2005 | Feduzi | A41D 13/012/82 |
| 7,043,761 B2 | 5/2006 | Epling | |
| 7,217,456 B1 | 5/2007 | Rock et al. | |
| 7,428,772 B2 | 9/2008 | Rock | |
| 7,743,476 B2 | 6/2010 | Rock et al. | |
| 7,977,261 B2 | 7/2011 | Szczesuil | |
| 8,028,386 B2 | 10/2011 | Rock et al. | |
| D655,921 S | 3/2012 | Snyder | |
| D657,093 S | 4/2012 | Snyder | |
| D666,837 S | 9/2012 | Elser | |
| 8,424,119 B2 | 4/2013 | Blackford | |
| 8,453,270 B2 | 6/2013 | Blackford | |
| 8,479,322 B2 | 7/2013 | Blackford et al. | |
| 8,510,871 B2 | 8/2013 | Blackford et al. | |
| 2002/0137417 A1 | 9/2002 | Tebbe | |
| 2002/0189608 A1 | 12/2002 | Raudenbush | |
| 2005/0009429 A1* | 1/2005 | Park | A41D 31/0027 442/181 |
| 2005/0053759 A1* | 3/2005 | Rock | A41D 31/00 428/91 |
| 2006/0135019 A1 | 6/2006 | Russell et al. | |
| 2007/0022510 A1 | 2/2007 | Chapuis et al. | |
| 2008/0155729 A1 | 7/2008 | Schwarz | |
| 2008/0189824 A1* | 8/2008 | Rock | D04B 1/02 2/69 |
| 2009/0061131 A1 | 3/2009 | Monfalcone et al. | |
| 2009/0298370 A1* | 12/2009 | Rock | A41D 31/0027 442/136 |
| 2010/0058509 A1 | 3/2010 | Lambertz | |
| 2010/0269242 A1 | 10/2010 | Stubiger | |
| 2010/0282433 A1 | 11/2010 | Blackford | |
| 2011/0041230 A1 | 2/2011 | Huang et al. | |
| 2011/0083246 A1 | 4/2011 | Vitarana | |
| 2012/0015155 A1* | 1/2012 | Blackford | A41D 31/0038 428/189 |
| 2013/0014311 A1 | 1/2013 | Chapuis | |
| 2013/0160193 A1 | 6/2013 | Cremin | |
| 2013/0209735 A1* | 8/2013 | Kim | B32B 3/14 428/141 |

FOREIGN PATENT DOCUMENTS

| | | |
|---|---|---|
| CN | 101405452 | 4/2009 |
| CN | 201509611 U | 6/2010 |
| DE | 247637 | 7/1987 |
| EP | 1816254 | 8/2007 |
| EP | 1816254 A1 | 8/2007 |
| GB | 2205533 | 12/1988 |
| GB | 2350073 A | 11/2000 |
| GB | 2389073 A | 12/2003 |
| JP | 01188336 | 7/1989 |
| JP | 01207403 | 8/1989 |
| JP | H01207403 | 8/1989 |
| JP | 02182968 | 7/1990 |
| JP | 03033251 | 2/1991 |
| JP | 03051301 | 3/1991 |
| JP | 031317284 | 6/1991 |
| JP | 03167301 | 7/1991 |
| JP | 05186728 | 7/1993 |
| JP | H1150378 | 2/1999 |
| JP | 2000129566 | 5/2000 |
| JP | 2000129567 A | 5/2000 |
| JP | 2001337601 | 12/2001 |
| JP | 2002088647 A | 3/2002 |

(56) References Cited

FOREIGN PATENT DOCUMENTS

| | | |
|---|---|---|
| JP | 2002166505 A | 6/2002 |
| JP | 2002371465 | 12/2002 |
| JP | 2003236971 A | 8/2003 |
| JP | 2003239111 | 8/2003 |
| JP | 3096192 U | 9/2003 |
| JP | 2006348414 A | 12/2006 |
| JP | 2010043388 | 2/2010 |
| KR | 20030019662 A | 3/2003 |
| TW | 571009 B | 1/2004 |
| TW | 200949043 A | 12/2009 |
| WO | 199707899 | 3/1997 |
| WO | 2002032692 | 4/2002 |
| WO | 2002103108 | 12/2002 |
| WO | 2005049745 | 6/2005 |
| WO | 2011114025 | 9/2011 |

OTHER PUBLICATIONS

"Raising." Complete Textile Glossary. New York, NY: Celanese Acetate, 2001. N. pag. Print.*
Gangolli, S. et al., The Dictionary of Substances and their Effects, 2005, Third Electronic Edition, Royal Society of Chemistry Retrieved from www.knovel.com.
Koo, Kang et al., The application of PCMMcs and SiC by commercially direct dual-complex coating on textile polymer, Applied Surf ace Science, 2009, 8313-8318, Elsevier B.V.

* cited by examiner

ARTICLE OF APPAREL INCLUDING THERMOREGULATORY TEXTILE

FIELD OF THE INVENTION

The present application relates to an article of apparel and, in particular, a garment including a textile adapted to regulate thermal conditions of the wearer and methods of forming the textile.

BACKGROUND OF THE INVENTION

The heat retention of a planar textile structure generally increases with increasing thickness. As thickness of the textile increases, however, resistance to the passage of moisture also increases. This results in apparel that, while warming, can cause the skin to be covered with uncomfortable perspiration. Accordingly, it would be desirable to form apparel from a textile that, while light, is capable of heat retention and transfers perspiration from the wearer.

BRIEF SUMMARY OF THE INVENTION

The present invention is directed toward a process of forming a textile and apparel formed utilizing the textile. The textile includes a base layer and a spacer layer defined by a plurality of spacer elements extending distally from the base layer. In an embodiment, the spacer elements are oriented in a grid pattern, being spaced apart to define gaps for air circulation. Selected spacer elements are mechanically compressed and secured in the compressed state utilizing an adhesive composition. The adhesive composition may further include heat insulating or heat reflective particles. The resulting textile may be utilized to form articles of apparel, including garments such as shirts, pants, coats, footwear, and underwear.

BRIEF DESCRIPTION OF THE SEVERAL VIEWS OF THE DRAWINGS

Like numerals refer to like components throughout the figures.

DETAILED DESCRIPTION OF THE INVENTION

Figure 1A:
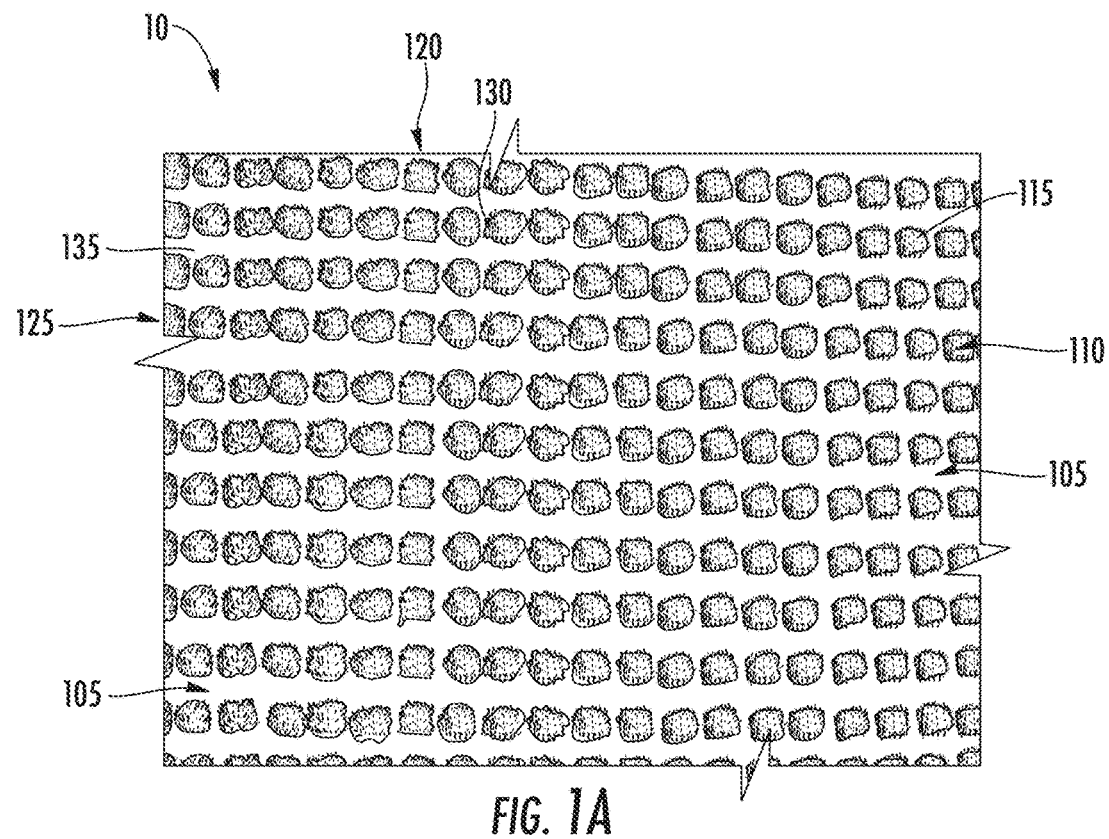
FIG. 1A is a top plan view of the front face of the textile for forming an article of apparel in accordance with the invention.
Figure 1B:
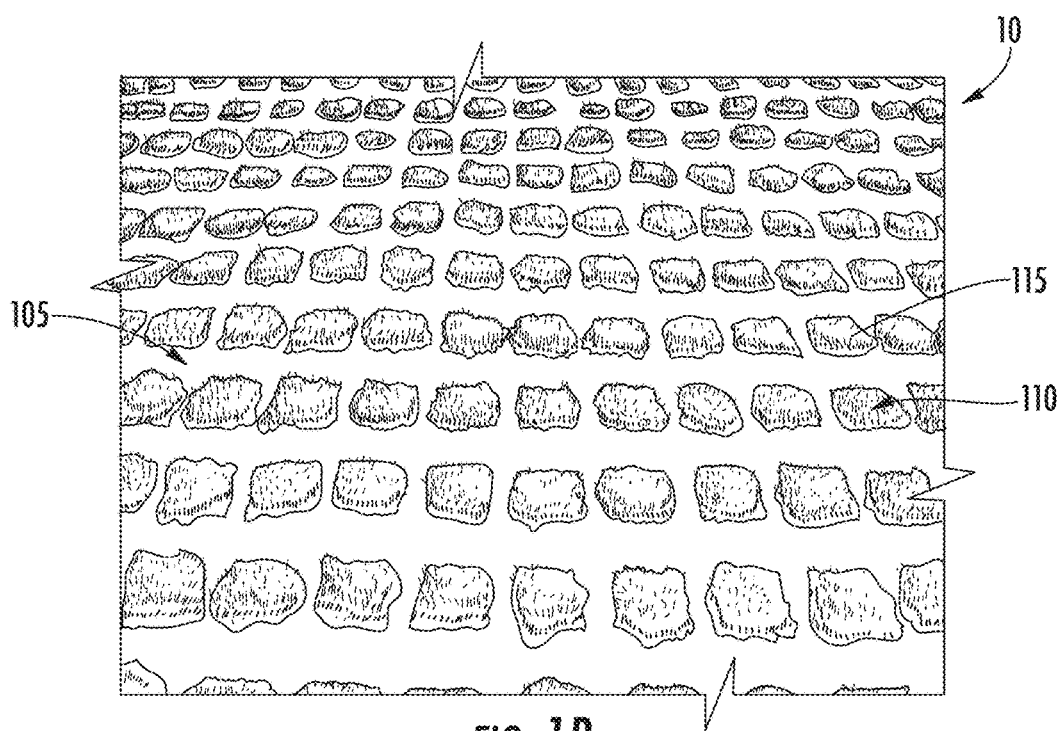
FIG. 1B illustrates a perspective view of the front face of the textile shown in FIG. 1A.
Figure 1C:
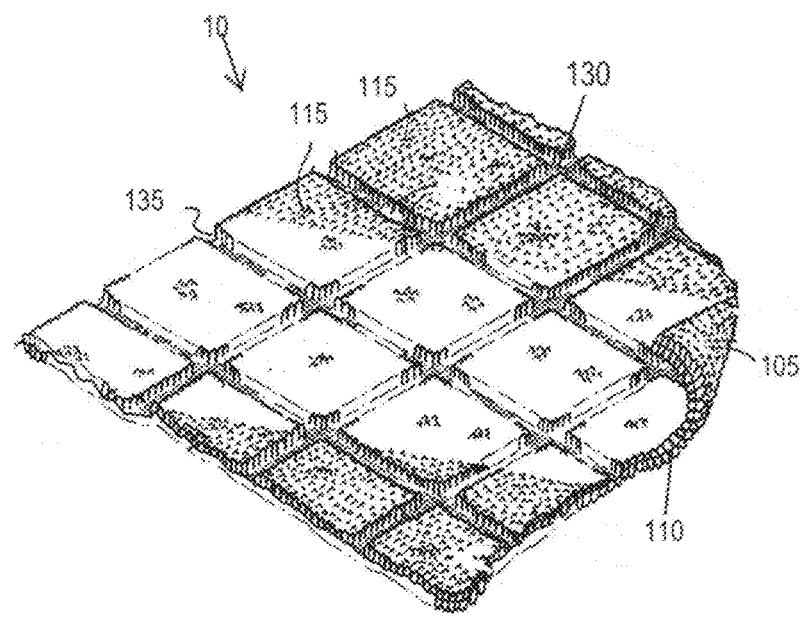
FIG. 1C illustrates a schematic of the front face of the textile shown in FIG. 1A.
Figure 2A:
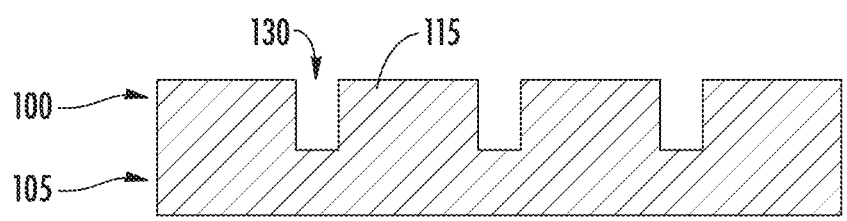
FIG. 2A illustrates a cross-sectional view of the textile shown in FIG. 1A.
Figure 2B:
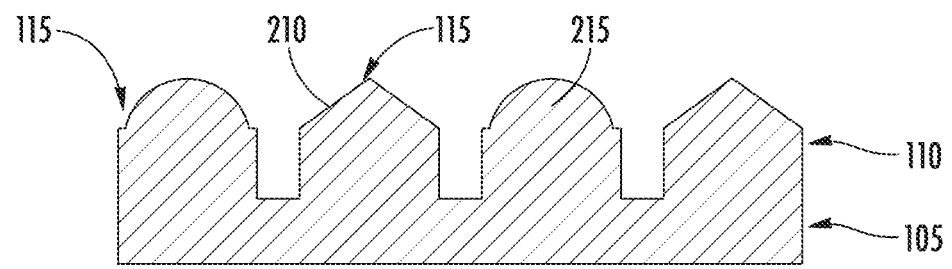
FIG. 2B illustrates a cross-sectional view of a textile in accordance with the invention.

With reference to FIGS. 1A-1C, the textile 10 according to the invention includes a first or outer layer or portion 105 and a second or inner layer or portion 110. The inner textile portion 110 is oriented such that it faces the wearer, i.e., it is oriented closer to the wearer than the outer textile portion 105 (i.e., the inner portion defines the face side of the fabric). In an embodiment, the inner portion 110 is in contact the wearer's skin. The inner textile portion 110 is discontinuous, being defined by one or more spacer elements 115 or bosses oriented in spaced relation from each other. Each spacer element 115 extends distally from the inner surface of the first textile portion 105, toward the wearer. The spacer elements 115 may possess any dimensions (size/shape) suitable for its described purpose (space the first textile layer 105 from the skin of the wearer and/or fluid movement). By way of example, the spacer elements 115 may possess a generally cylindrical shape (e.g., a right cylinder), or may be a polygon, possessing, e.g., a generally rectangular or a generally square shape. The diameter (length and/or width) of the spacer element 115 may be approximately up to 2 cm (e.g., 0.5 mm-5 mm). The height of the spacer element 115 may be approximately 0.10-6 mm. In a preferred embodiment, the spacer elements 115 are generally square, possessing length of approximately 2 mm and a width of approximately 2 mm. Referring to FIGS. 2A and 2B, the distal end of the spacer elements 115 may be generally square, or may be configured with a tapered 210 or rounded 215 edge, which assists in fluid roll off (explained in greater detail below).

The spacer elements 115 are arranged in a predetermined pattern along the interior surface of the first textile portion 105 such that channels or gaps between adjacent elements. In an embodiment, the spacer elements 115 are disposed in an array. By way of example, the spacer elements 115 form a matrix, i.e., a rectangular array of elements ordered in columns 120 and rows 125 (FIG. 1A). With this configuration, a plurality of intersecting, elongated channels is defined between the rows and columns. Specifically, first or vertical channels 130 (from the viewpoint of FIG. 1A) are defined between adjacent columns 120, while horizontal channels 135 are defined between adjacent rows 125. The channels 130, 135 intersect each other at right angles to form a channel grid. The first channel 130 may possess the same dimensions as the second channel 135, or may possess different dimensions. In an embodiment, the first channel 130 may include a transverse dimension (width/height) that is less than the transverse dimension of the second channel 135 (i.e., the channels 135 between rows 125 are wider than the channels 130 between columns 120). By way of example, the ratio of the transverse dimension of the second channel 135 to the transverse dimension of the first channel 130 may be in the range of 1:1-4:1 (e.g., 2:1, 3:1, etc.). By way of specific example, the horizontal channel 135 may be approximate 1 mm wide, while the vertical channel 130 may be approximately 0.5 mm wide.

Figure 3A:
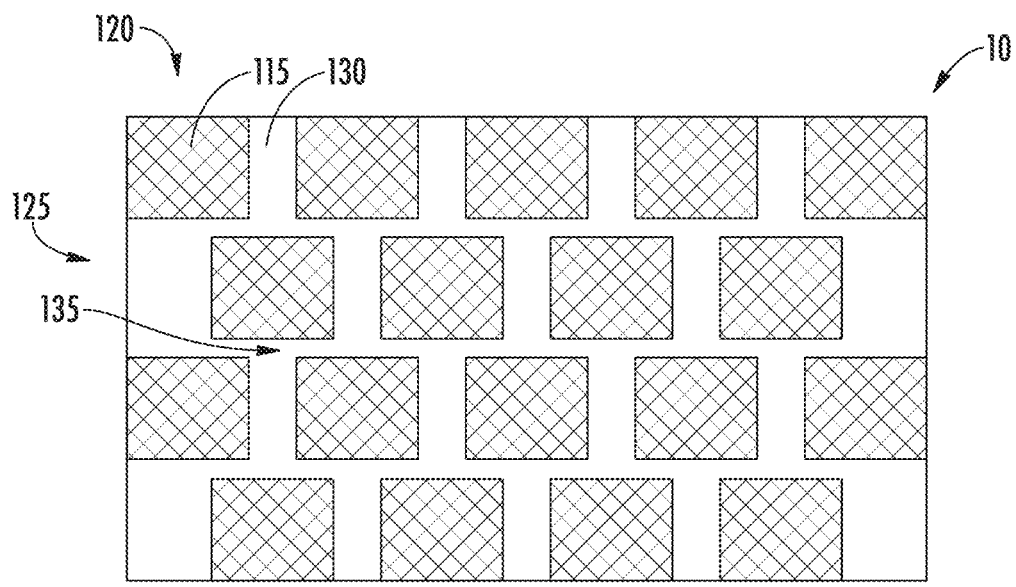
FIGS. 3A and 3B illustrate schematic views of the front face of the textile, showing spacer elements in a brickwork pattern (FIG. 3A) and checkerboard pattern (FIG. 3B).
Figure 3B:
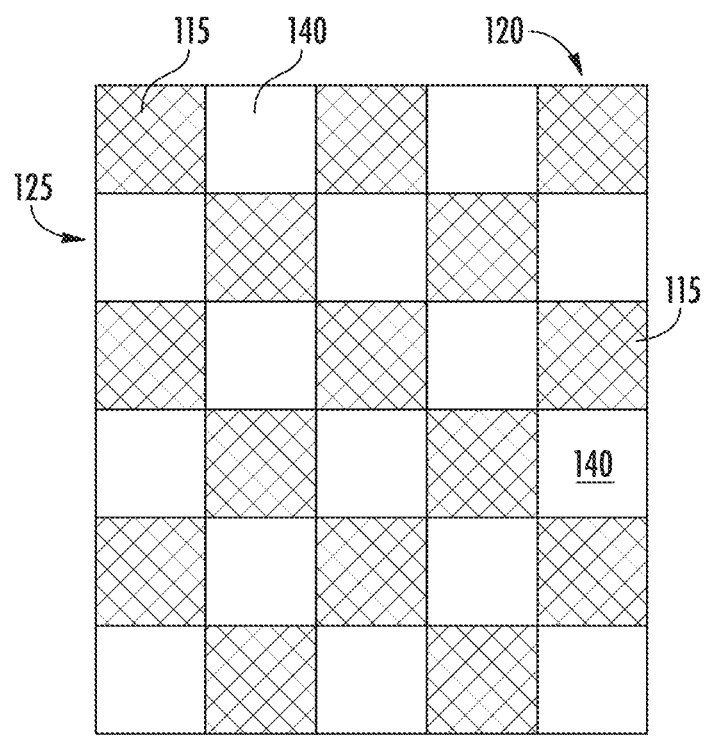

Referring to FIG. 3A, in another embodiment of the invention, the array is an offset matrix in which adjacent rows 125 and columns 120 are offset from each other such that the channels 130, 135 do not extend the full width/length of the textile (i.e., the channels are interrupted by spacer elements). Referring to FIG. 3B, furthermore, the spacer elements 115 may be offset along the columns and rows such that the elements are oriented in a checkerboard style layout. In this configuration, no elongated channels are formed; instead, pockets 140 are defined between adjacent elements 115 along the rows 120 and columns 125.

Figure 1D:
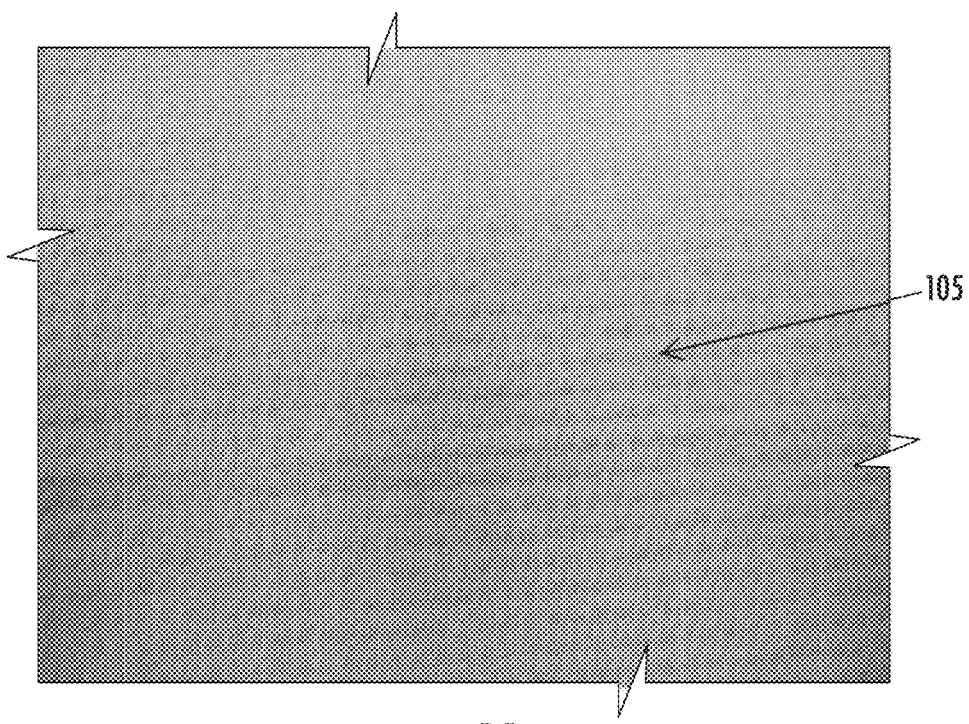
FIG. 1D illustrates top plan view of the rear face of the textile shown in FIG. 1A.

Referring to FIG. 1D, the back face of the textile 10 (the surface facing outward, away from the wearer) may be smooth or substantially smooth. For example, the outer surface of the first textile portion 105, while possessing a texture, does not include spacer elements extending from its outer surface.

The textile 10—the first textile portion 105 and the second textile portion 110—may be formed of the same or similar yarn. By way of example, the textile portions 105, 110 may be formed of hydrophobic yarn such as polyester or polypropylene. In another embodiment, the textile portions 105, 110 may be formed of hydrophilic yarn such as cotton or wool. In still other embodiments, the textile portions 105, 110 may be formed of a combination of hydrophobic and hydrophilic yarns. In a preferred embodiment, the textile 10 (the first 105 and second 110 textile portions) is formed of hydrophobic yarn (e.g., polyester) provided with hydrophilic properties, e.g., via chemical treatment (such as a conventional wicking finish).

In other embodiments, the first textile portion 105 and the second textile portion 110 are formed of yarns having different properties. By way of example, the second textile portion 110 may be formed of untreated hydrophobic yarn and the first textile portion 105 may be formed of hydrophobic yarn treated such that it possesses hydrophilic properties 110. By way of further example, the second textile portion 110 may be formed of hydrophobic yarns and the first textile portion 105 may be formed of hydrophilic yarns. By way of still further example, the yarns of the first portion 105 and/or the second portion 110 may be treated with a durable water repellant (DWR) composition. Additionally, the denier of the yarns forming the first 105 and second 110 portions may differ (e.g., the denier of the first portion yarns may be greater than the denier of the second portion yarns).

With the above configuration, a textile 10 including channels 130, 135 or pockets 140 is formed. The spacer elements 115 and the channels 130, 135 or pockets 140 cooperate to control movement of fluid within and through the textile 10. Regarding liquid, the structure drives liquid from the second textile portion 110 to the first textile portion 105. Specifically, when fluid contacts the surface of a spacer element 115, it is drawn/moved along the length/height of the spacer element and into the first textile portion 105, where it diffuses/spreads. Additionally, when liquid falls directly into a channel 130, 135 or pocket 140, the liquid immediately contacts the first textile portion 105 where it diffuses/spreads.

Alternatively, when the spacer elements 115 are non-wicking and/or hydrophobic, the liquid may contact the spacer elements 115, rolling off the spacer element into the channel 130, 135 or pocket 140. To this end, as mentioned above, the spacer elements 115 may be configured with a tapered 210 or rounded 215 edge, assisting in fluid roll off (FIG. 2B).

With these configurations, liquid from the user (i.e., sweat) is immediately directed from the spacer element 115 and into a channel 130, 135 or pocket 140. In other words, liquid is directed from the second textile portion 110 to the first textile portion 105, where the liquid is held away from the skin of the wearer. This improves wearer comfort.

It should be noted that the yarn may be selected to impart desired fluid absorption characteristics to the textile. That is, the first textile portion 105 may possess a first sorptivity (capillary action) value and the second textile portion 110 may possess a second sorptivity (capillary action) value. In an embodiment, the first sorptivity value is greater than the second sorptivity value (e.g., when the first portion is hydrophilic and the second portion is hydrophobic). In another embodiment, the first sorptivity value is less than or equal to the second sorptivity value. In a preferred embodiment, the first textile portion 105 generates greater capillary action (and thus possesses higher fluid sorptivity) than the second textile portion 110.

It should also be understood that while the textile portions 105, 110 may be generally hydrophobic or hydrophilic, the relative degree of the relevant property may differ. For example, while the first textile portion 105 and the second textile portion 110 may be considered hydrophobic, the second textile portion 110 may be less hydrophobic than the first textile portion 105 (and vice versa), i.e., the second textile portion experiences a greater moisture pick-up under a standard atmosphere (moisture pick up being measured by the mass of absorbed and adsorbed water that is held by a material). Similarly, while both textile portions 105, 110 may be considered generally hydrophilic, the second textile portion 110 may be less hydrophilic than the first textile portion 105 (and vice versa). Alternatively, the portions 105, 110 may possess identical wicking properties.

Along with liquid flow, the textile structure 10 further enables movement of air along and through the textile 10. While both the first textile portion 105 and the second textile portion 110 are air permeable, the air permeability of the textile 10 along a channel 130, 135 or pocket 140 is greater than the air permeability of the textile along a spacer element 115. Accordingly, the channels 130, 135 or pockets 140 capture air and direct it out through the textile 10 (via the first textile portion 105), enhancing air flow during physical activity, thereby creating a heat dissipating or cooling effect. In a preferred embodiment, the first textile portion 105 possesses higher vapor permeability (breathability) than the second textile portion 110 (in its unprinted state).

The textile 10 may be formed utilizing any process suitable for its described purpose. In an embodiment, the textile 10 is knitted to form a unitary structure. By way of example, the textile is formed via warp knitting. By way of further example, the textile 10 is a double knit jacquard formed via a process that simultaneously forms both textile portions 105, 110. While forming the second textile portion 110, knitting is selectively started and stopped at predetermined positions to form spacer elements 115. Stated another way, the channels 130, 135 or pockets 140 are formed wherever the knitting operation is suspended (creating regions that are substantially free of pile) and spacer elements 115 are formed wherever the knitting operation is resumed (creating regions including pile).

In other embodiments, the textile 10 possesses loop pile construction. By way of example, the textile 10 may be formed as described U.S. Pat. No. 5,065,600 or 5,547,733, the disclosure of each patent is incorporated herein by reference in its entirety. In still other embodiments, the first 105 and second 110 textile portions are independent layers secured together, e.g., via adhesive, stitching, etc. Accordingly, the textile 10 may possess a unitary construction, or may be formed of multiple, distinct layers.

In order to control the properties of the article of apparel, the textile 10 may be processed to selectively seal areas of the fabric and compress the fibers, filaments or yarns forming the textile. In an embodiment, one or both textile portions 105, 110 may be compressed and sealed to minimize its breathability and/or fluid abortion properties. Specifically, the filaments, fibers, or yarns along the surface of a textile portion 105, 110 may compressed by an applicator and secured in its compressed state utilizing an adhesive or sealant composition.

Figure 4A:
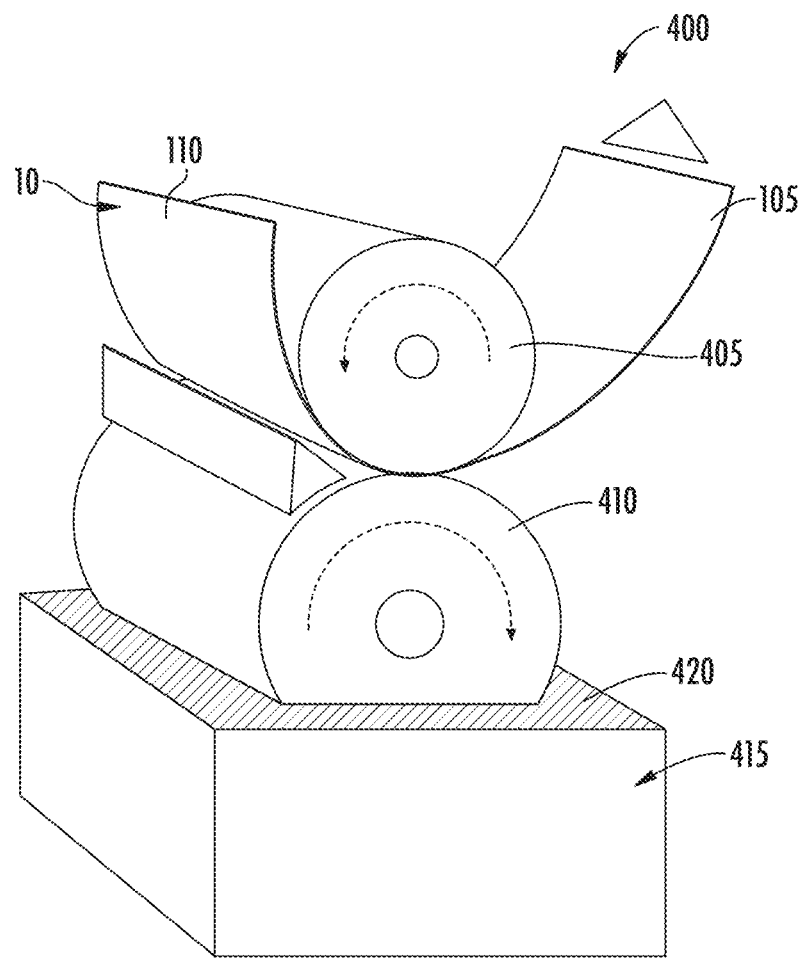
FIGS. 4A and 4B each illustrates a gravure apparatus to apply the adhesive composition to the textile.

In an embodiment, the textile 10 may be further processed to selectively compress and/or seal one or more of the spacer elements 115, as well as to selectively seal all or part of the channels 130, 135 or pockets 140. Specifically, one or more spacer elements 115 is fully or partially compressed by an applicator and secured in its compressed state utilizing an adhesive or sealant composition. By way of example, the textile 10 may be processed by a rotogravure apparatus configured to simultaneously compress a selected spacer element 115 and apply an adhesive or sealant composition to the compressed spacer element. Referring to FIG. 4, the rotogravure apparatus 400 includes an impression roller 405, a gravure cylinder 410, and a tank 415 that holds the adhesive compositing or sealing agent 420. The cylinder 410 is engraved with surface cells (not illustrated) that captures the adhesive composition or sealing agent 420 from the tank 415 and transfers the adhesive to the textile 10. The cells are positioned on the cylinder 410 such that they selectively register/align with one or more of the spacer elements 115 and/or one or more channels 130, 135 or pockets 140 on the textile 10. Accordingly, when the textile 10 contacts the cylinder 410, the adhesive composition 420 is applied in a discontinuous pattern on the front side of the textile, selectively compressing and securing the spacer elements 115 in their compressed state (FIGS. 5A and 5B) (discussed in greater detail below).

Figure 4B:
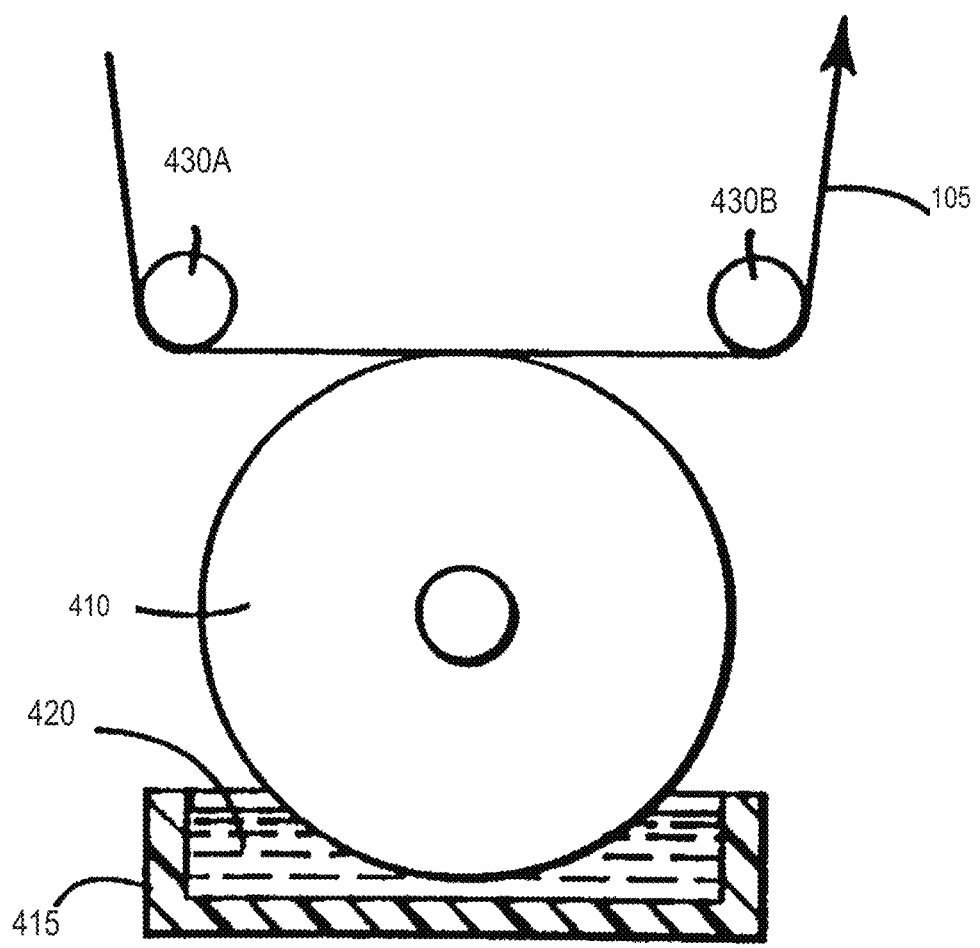

In another embodiment, the rotogravure is a reverse kiss gravure coater. Referring to FIG. 4B, the gravure cylinder 410 rotates in the opposite direction of the substrate; moreover, an impression roller 405 is not utilized. Instead, the textile 10 passes between a pair of idler rollers 430A, 430B, which are offset from the gravure cylinder 410. Accordingly, the textile 10, under tension, contacts (is pressed against) the gravure cylinder 410, transferring the adhesive composition and/or compressing the spacer elements 115. An exemplary reverse kiss gravure apparatus and process is disclosed in WO1997007899A1, the disclosure of which is incorporated by reference in its entirety.

In an embodiment, the speed of the roller may be approximately 30 revolutions per minute, and the applied wet coating possesses a thickness of no more than 30 μm.

The adhesive composition 420 may be any adhesive suitable for its described purpose. For example, the adhesive includes a polymeric binder such as polyurethane. Polyurethane, while flexible, is effective to fill the voids of the textile (i.e., the air passages present in each the first textile portion 105 and the second textile portion 110), reducing or preventing air from passing through at its point of application.

The adhesive composition 420 may further include insulating, heat-conducting, or heat-reflecting material dispersed in the binder. By way of example, the adhesive composition 420 may contain inorganic materials such as ceramics (technical ceramics and refractory materials), as well as metals. By way of specific example, the adhesive composition may include silica ($SiO_2$), silicon nitride (SiN), zeolite, zirconium dioxide ($ZrO_2$), calcium silicate, calcium carbonate, aluminum nitride (AlN), alumina ($Al_2O_3$), silicon carbide (SiC), and magnesium oxide (MgO), copper, aluminum, etc. In a preferred embodiment, the coating includes silica capable of absorbing thermal energy such as body heat.

In an embodiment, the adhesive composition may possess a viscosity of no more than 1000 mPa·s.

Figure 5A:
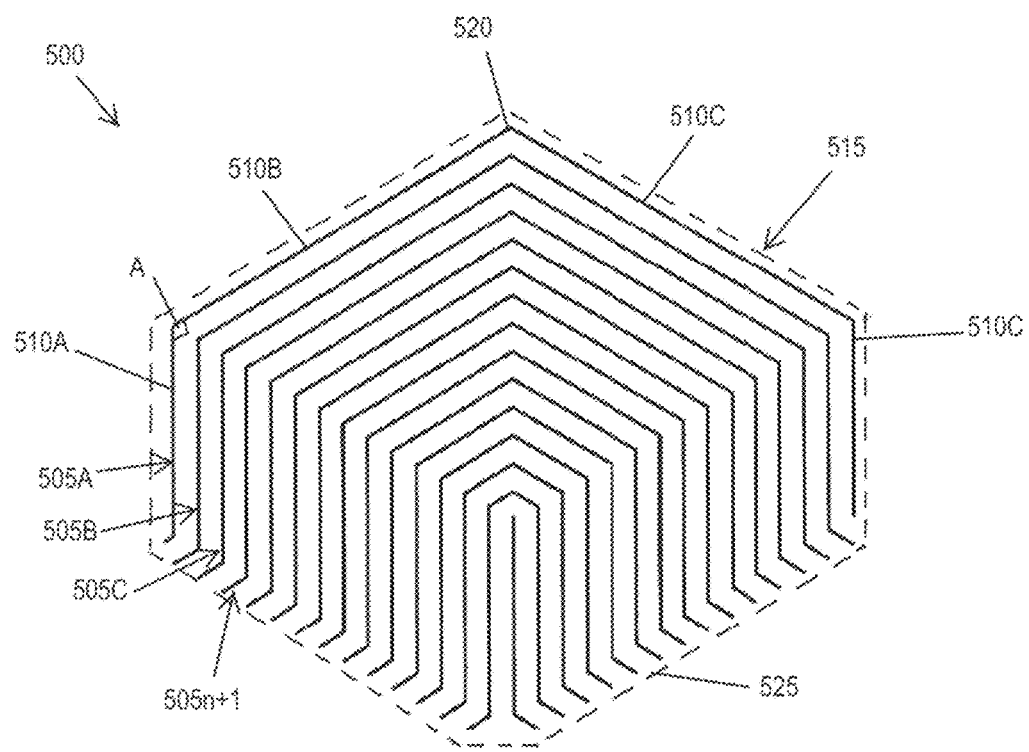
FIG. 5A illustrates an adhesive pattern in accordance with the invention.

The adhesive composition 420 may be applied in any pattern suitable for its described purpose. In an embodiment, the adhesive composition 420 is applied in an interrupted or discontinuous pattern. Preferably, the discontinuous layer is configured such that the adhesive composition covers no more than 50% the surface area of the textile front face (the user facing face). In an embodiment, the adhesive composition 420 is applied as a vector pattern. Referring to FIG. 5A, the adhesive pattern 500 includes a linear member 505A, 505B, 505C, 505n+1 formed of segments 510A, 510B, 510C, 510D oriented at a predetermined angle A with respect to each other (e.g., an acute angle). The dimensions of the linear member 505A-505n+1 (and thus of the segments 510A-510D) may be any suitable for its described purpose. By way of example, the transverse dimension (width) of the linear member 505A-505n+1 may correspond to the width/diameter of a spacer element. In other embodiments, the transverse dimension of the linear member 505A-505n+1 may be greater or less than the transverse dimension (diameter) of a spacer element 115 and/or greater or less than the transverse dimension (width/height) of the channels 130, 135 or pockets 140. By way of specific example, the transverse dimension of each linear member 505A-505n+1 is approximately 1-5 mm (e.g., 2 mm or 3 mm).

The pattern 500 may further include a plurality of linear members 505A-505n+1 ordered to form a superstructure 515 such as a polygon and, in particular, a hexagon. As seen in FIG. 5A, the superstructure 515 includes a plurality linear members 505A-505n+1 disposed in a nested arrangement. Each linear member 505A-505n+1 is a partial hexagon with an apex 520 along the upper side of the nested arrangement and a broken border 525 along the lower side of the nested arrangement.

Figure 5B:
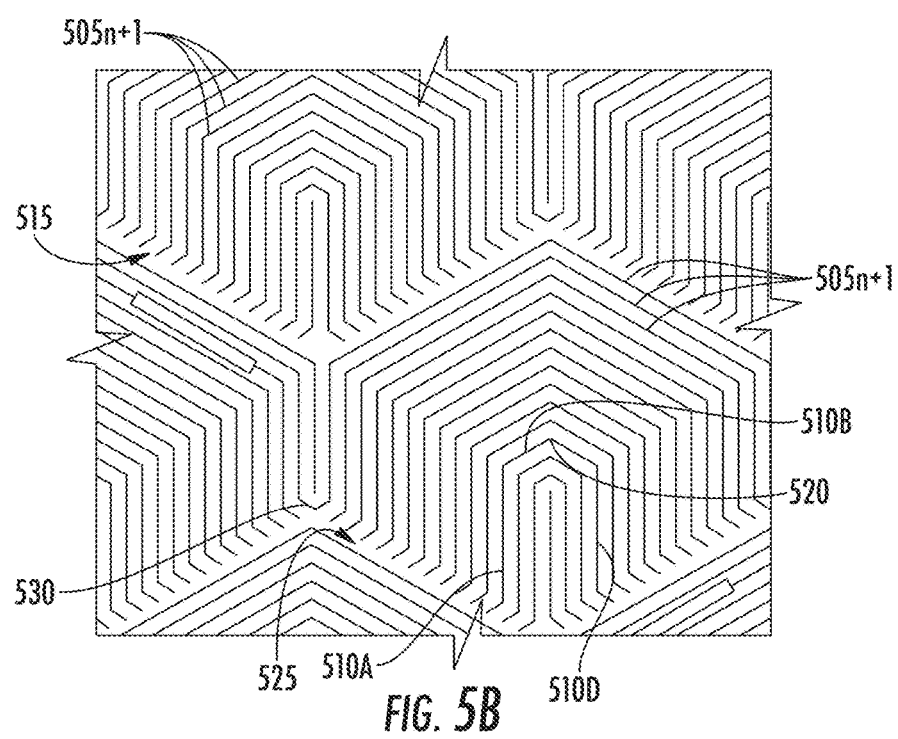
FIG. 5B illustrates an adhesive pattern layout in accordance with the invention.

Referring to FIG. 5B, in an embodiment, the pattern 500 includes a plurality of superstructures 515 positioned adjacent each other in a honeycomb-like manner, with adjacent rows being offset. The array of superstructures 515 interconnected via a link 530. In an embodiment, the second linear member 505B of one superstructure 515 is connected to the first linear member 505A of a second superstructure along the link 530.

With these arrangements, the linear members $505A-505_{n+1}$ can span portions of the wearer, improving the capture and/or distribution of thermal energy (e.g., body heat) generated by the wearer. That is, the linear elements enable the efficient absorption and dispersion of heat over a wider surface area than, e.g., dots or circles. That is, if the first segment 510A of a linear member is positioned over an area of the body generating heat, while the third segment 510B is not, the first segment will initially absorb heat. The absorbed heat will then travel (be conducted) between segments $510A-510_{n+1}$. This is in contrast with individual circles or squares, which, being spaced from each other, do not dispersing it along the surface of the wearer.

Figure 6:
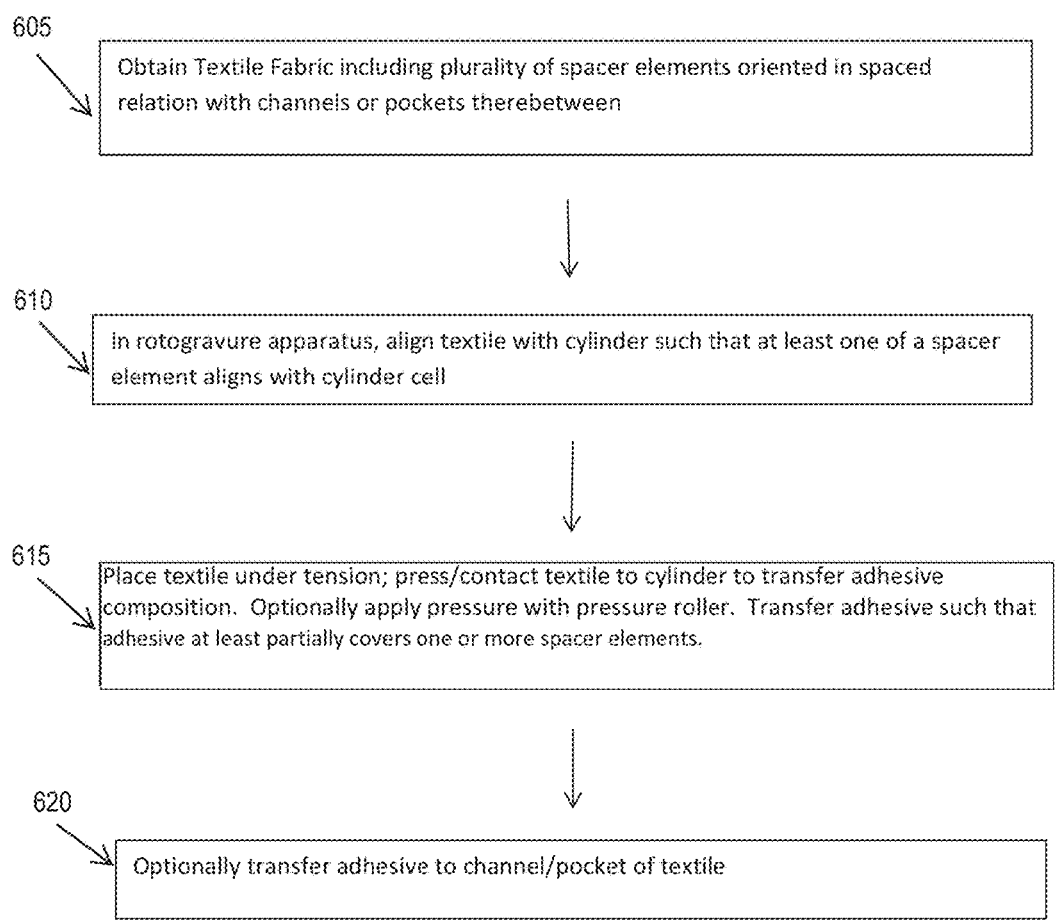
FIG. 6 is a flow diagram including steps of forming the textile
Figure 7A:
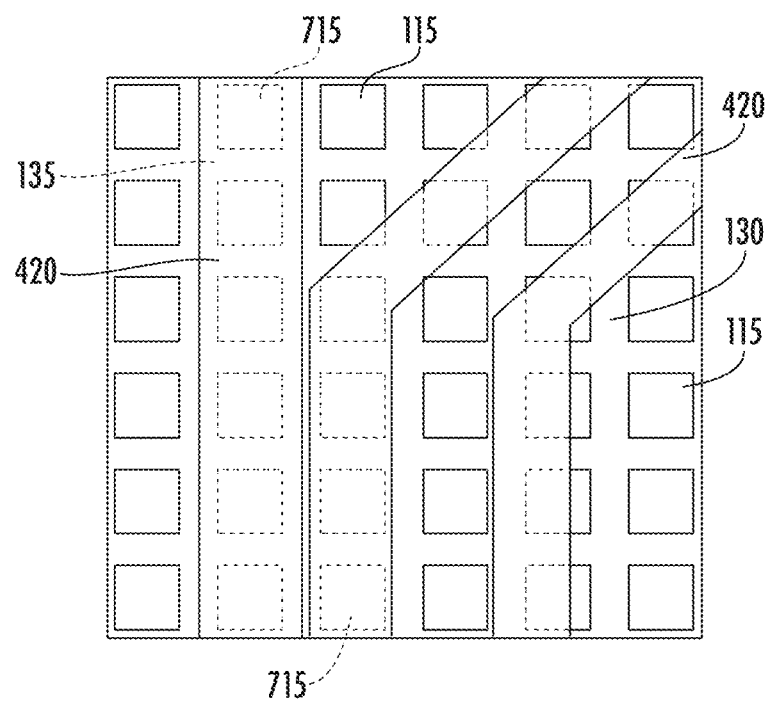
FIG. 7A is a top plan view of the front face of the textile, showing selected spacer elements being secured by adhesive strip.
Figure 7B:
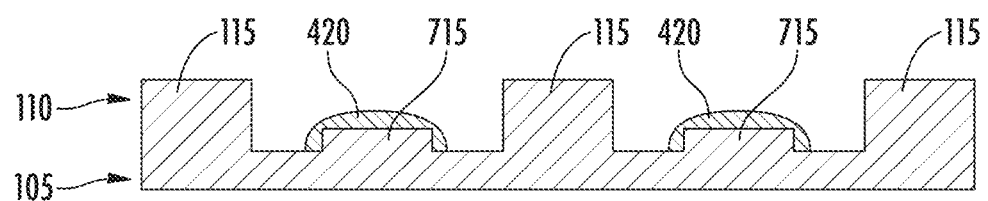
FIG. 7B illustrates a cross sectional view of the textile, showing compressed and expanded spacer elements.

Formation of the textile 10 with selectively compressed spacer elements is explained with reference to FIG. 6. First, the textile 10 is obtained (Step 605), e.g., formed via the knitting processes explained above. The textile 10 is placed in the rotogravure apparatus 400 (Step 610), where the impression roller 405 contacts the exposed (outer) surface of the first textile portion 105, urging the exposed (inner)

surface of the second textile portion 110 (including the spacer elements 115) against the gravure cylinder 410. The cells of the gravure cylinder 410, having a depth of 100 µm-200 µm (e.g., 150 µm), are configured to align with selected spacer elements 115. The cylinder cells will contact the selected spacer elements 115, compressing the spacer element to form a compressed spacer element 715 (FIG. 7A). While compressed, the cylinder 410 applies/transfers the adhesive composition 420 to the surface of the textile 10 (Step 615). The transferred adhesive composition 420 secures the compressed spacer element 715 in its compressed state (FIG. 7B). After transfer, the applied adhesive composition 420 may be dried via a heater (at, e.g., 100° C.).

Accordingly, as shown in FIGS. 7A and 7B, the resulting textile 10 includes a partially or fully compressed spacer elements 715 and uncompressed (expanded) spacer elements 115. Additionally, the adhesive composition 420 may be selectively transferred to a channel 130, 135 or pocket 140, sealing the channel with adhesive (Step 620) and reducing air permeability (breathability) at the point of application.

Once transferred, the adhesive composition 420 may completely cover a spacer element 715 (securing the entire spacer element in its compressed configuration) or may partially cover a spacer element 115 (securing a portion of the spacer element in the compressed configuration). Accordingly, the resulting textile 10 includes a plurality of expanded spacer elements 115 extending distally from the first textile portion 105 at a first height and a plurality of compressed spacer elements 715 extending from the first textile portion 105 at a second height, with the second height being less than the first height. Depending on the pressure applied, the distal end of each compressed spacer element 715 may be substantially or completely flush with the textile surface (i.e., with the surface of the first textile portion 105), or may be slightly recessed into the textile surface. In compressed areas not including a spacer element 115, the surface including the compressed fibers, filaments, or yarns may be recessed or substantially flush with the surrounding non-compressed areas, depending on the pressure applied.

The resulting textile 10 (and the article of apparel made therefrom) possesses improved thermoregulatory control compared to a textile lacking the adhesive composition. That is, the textile 10 possesses improved heat retention and distribution capabilities without increasing the overall weight of the textile/article of apparel (or increasing the weight by only a nominal amount). In the sealed areas, transmission of fluid (liquid/air) through the textile 10 is delayed or prevented. Without being bound to a particular theory, it is believed that the binder (e.g., polyurethane) of the adhesive composition 420 seals the textile 10 by covering the pores or openings existing within the fabric, decreasing airflow and liquid flow therethrough. Decreasing the air permeability of the textile (and thus of the article of apparel) increases its insulating properties of the textile. The heat of the wearer, moreover, is retained in the air pockets naturally existing between the wearer and the textile 10 (or between the textile and another fabric layer).

Wearer comfort, however, is maintained. The adhesive composition 420, being applied as a discontinuous layer, maintains the breathability of the textile. In addition, any liquid contacting a sealed area may simply roll of the sealed area to an unsealed area, being moved away from the user.

In addition, the adhesive composition 420 may further include insulation or other heat retaining material, further increasing the insulation properties of the composition, and thus the textile 10 (compared with the textile printed with the adhesive composition lacking insulation material). That is, if the adhesive composition 420 further includes an insulating material, the composition is effective to decrease thermal conductivity through the textile, increasing its absorption of heat. For example, when silica is present in the adhesive composition 420, the silica, having a specific heat capacity value that is greater than that of, e.g., the textile 10 and/or the binder, is capable of absorbing heat from the wearer. Even when the heat energy is removed, the heat retaining material may then release the stored energy, warming the microclimate around the wearer.

In still further embodiments, the heat retaining material may be selected to emit or radiate selected wavelengths back to wearer (e.g., IR waves), when the heat source is removed.

Examples of heat retaining materials include ceramics such as $AlO_2$, $ZnO$, $SnO_2$, $TiO_2$, $SiO_2$, $SiC$ and $ZrC$. The heat retaining material may be present in an amount of less than 50 wt % and, in particular, less than 25 wt % (e.g., 2-10 wt %).

If the adhesive composition 420 includes a heat conductive material, the heat of the wearer will be absorbed and will be evenly dispersed along the composition, increasing the overall feeling of warmth, with the heat being transferred from a warmer part of the body to a cooler part.

Finally, if the adhesive composition 420 further includes a heat-reflective material, the composition is effective to reflect the heat of the wearer back towards the wearer, increasing the feeling of warmth.

Regardless of the type of adhesive composition used, the overall fluid control characteristics remain intact since a substantial portion of the channels 130, 135, pockets 140, and/or spacer elements 115 remain exposed (unsealed/unprinted). That is, while overall air permeability (breathability) is reduced, the article of apparel still retains a substantial level of breathability, increasing user comfort. Thus, the invention increases user warmth, adds minimum weight to the textile 10, and retains the base properties of the textile such as breathability.

In this manner, a garment can be provided that, while capable of moving sweat away from the wearer to provide the wearer with a feeling of dryness, also provides a warming effect while worn.

In addition, since the adhesive composition or sealing agent 420 is applied in a discontinuous pattern along the inner fabric surface, the resulting garment includes areas possessing different air permeability and/or heat retention values. Specifically, the area of fabric including the sealing agent possesses a first air permeability value, while the area of fabric not including the sealing agent possesses a second air permeability value. The second air permeability value is higher than the first air permeability value. Additionally, area of fabric including the sealing agent with a heat retaining or insulating material possesses a first heat retention value, while the area of fabric not including the sealing agent with the heat retention material possesses a second heat retention value, with the second heat retention value being lower than the first heat retention value.

When the discontinuous pattern of FIGS. 5A and 5B is utilized, the article of apparel according includes not only alternating bands of first and second air permeability values, but also alternating bands of first and second heat retention values. Accordingly, it is possible to control the level of insulation in the garment by selectively applying a predetermined amount of adhesive composition or sealing agent 420 to the textile (the greater the coverage of the sealing agent 420, the lower the fluid movement and the greater the heat retention property of the garment).

Figure 8:
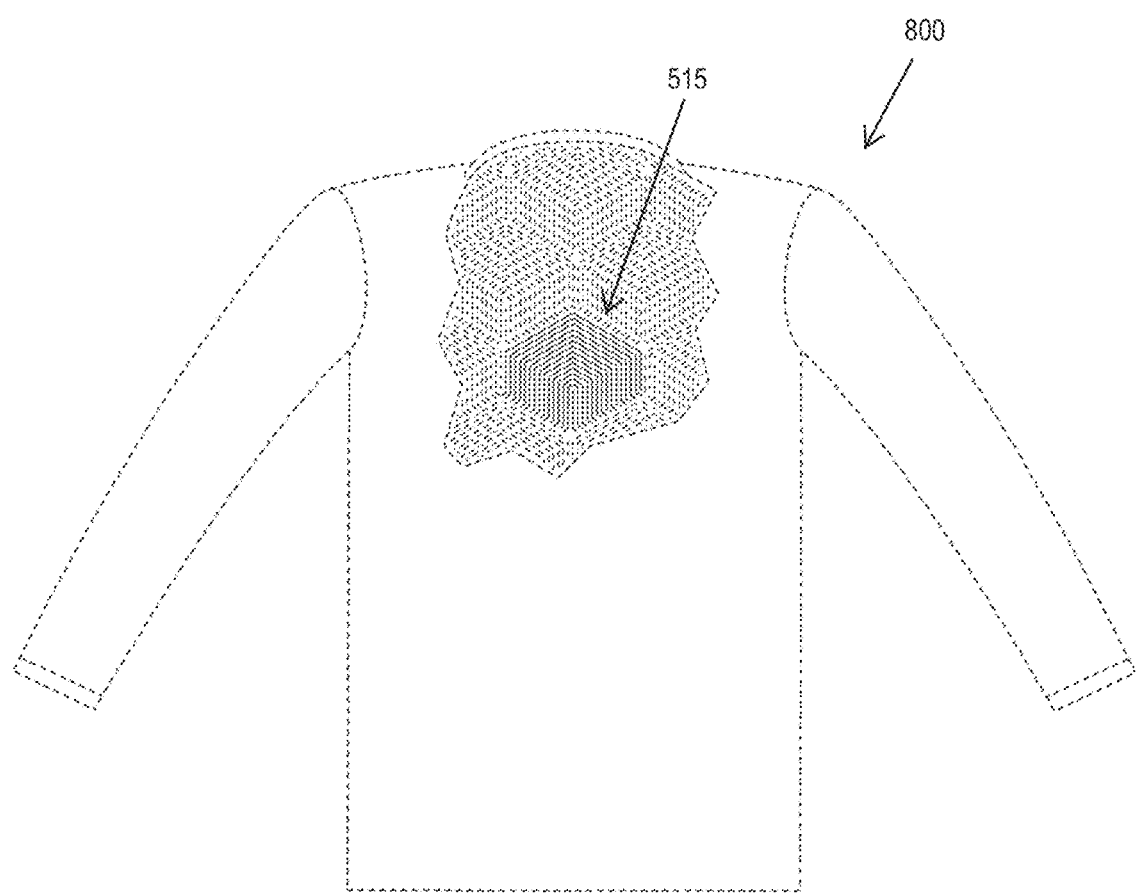
FIG. 8 illustrates an article of apparel formed from the textile of FIG. 1A.

The textile 10 formed according to the principles of the present invention may be used in a number of different products. For example, the textile 10 may be incorporated into a shirt 800 (FIG. 8) where the second textile portion 105 is positioned along the inside of the shirt, facing the wearer.

While the invention has been described in detail and with reference to specific embodiments thereof, it will be apparent to one skilled in the art that various changes and modifications can be made therein without departing from the spirit and scope thereof. In at least one embodiment, the ceramic print covers about 25% to about 80% of the interior surface area of the article of apparel (e.g., about 35%-45%).

Thus, it is intended that the present invention covers the modifications and variations of this invention provided they come within the scope of the appended claims and their equivalents. It is to be understood that terms such as "top," "bottom," "front," "rear," "side," "height," "length," "width," "upper," "lower," "interior," "exterior," "medial," "lateral," and the like as may be used herein, merely describe points of reference and do not limit the present invention to any particular orientation or configuration.

What is claimed is:

1. An article of apparel formed from a textile, the textile comprising:
   a generally continuous first textile portion; and
   a discontinuous second textile portion comprising a plurality of spacer elements extending distally from the first textile portion, the plurality of spacer elements defining an array of spacer elements ordered in columns and rows with a plurality of intersecting elongated channels defined between the rows and columns;
   wherein the plurality of spacer elements includes an expanded spacer element and a compressed spacer element, wherein the compressed spacer element includes compressed yarns compressed into a compressed state via pressure, the compressed spacer element being secured in its compressed state by a sealing agent, wherein the compressed spacer element includes a distal end that is substantially flush with the first textile portion, and wherein the sealing agent comprises a heat retaining material selected from the group consisting of $AlO_2$, $ZnO$, $SnO_2$, $TiO_2$, $SiO_2$, $SiC$, $ZrC$, and combinations thereof;
   wherein the article of apparel defines an inner side and an outer side of the first textile portion, wherein the inner side of the first textile portion and the plurality of spacer elements of the second textile portion define an inner surface configured to face a wearer of the article of apparel; and
   wherein the sealing agent is applied as a discontinuous pattern exposed along the inner surface, the discontinuous pattern contacting each of the first textile portion and the second textile portion along a continuous stretch extending between at least two of the compressed spacer elements, wherein an area of the article of apparel including the sealing agent within the discontinuous pattern possesses a first air permeability value, and wherein an area of article of apparel not including the sealing agent outside of the discontinuous pattern possesses a second air permeability value, the second air permeability value higher than the first air permeability value such that the discontinuous pattern defines alternating bands of first and second air permeability values along the article of apparel.

2. The article of apparel according to claim 1, wherein the sealing agent extends over and across the compressed spacer element, thereby securing the compressed spacer element in its compressed configuration.

3. The article of apparel according to claim 1, wherein:
   the expanded spacer element extends from the first textile portion at a first height;
   the compressed spacer element extends from the first textile portion at a second height; and
   the second height is less than the first height.

4. The article of apparel according to claim 1, wherein the textile comprises hydrophobic yarn.

5. The article of apparel according to claim 4, wherein the textile consists essentially of hydrophobic yarn.

6. The article of apparel according to claim 1, wherein the first plurality of compressed spacer elements are formed by a process of reducing a height of a distal end of each of the first spacer elements above the generally continuous first textile portion from a first height to a second height.

7. The article of apparel according to claim 1 wherein the sealing agent is effective to reduce an air permeability of the article of apparel.

8. The article of apparel according to claim 1, wherein the sealing agent comprises a binder and a heat retaining material.

9. The article of apparel according to claim 8, wherein:
   the area of article of apparel including the sealing agent further possesses a first heat insulating value;
   the area of the article of apparel not including the sealing agent further possesses a second heat retention insulating value; and
   the second heat insulating value is lower than the first heat retention value, wherein the discontinuous pattern further defines alternating bands of first and second heat insulating values along the article of apparel.

10. An article of apparel formed from a textile, the textile comprising:
    a generally continuous first textile portion; and
    a discontinuous second textile portion comprising a plurality of spacer elements extending distally from the first textile portion on an inner side of said article of apparel configured to face a wearer of the article of apparel, the plurality of spacer elements defining an array of spacer elements ordered in columns and rows with a plurality of intersecting elongated channels defined between the rows and columns, the plurality of spacer elements including a plurality of uncompressed spacer elements oriented in spaced relation from a plurality of compressed spacer elements to define a gap between the uncompressed spacer element and the compressed spacer element,
    wherein at least a portion of each compressed spacer element is secured in a compressed state by a sealing agent such that the portion of each compressed spacer element includes a distal end that is substantially flush with the first textile portion, wherein the sealing agent is applied to the inner side of said article of apparel in a pattern such that said sealing agent covers a first area of the first textile portion and the second textile portion, but does not cover a second area of the first textile portion and the second textile portion.

11. The article of apparel according to claim 10, wherein each of said plurality of compressed spacer elements is formed by a process of applying pressure to one of the plurality of uncompressed spacer elements to form the compressed spacer element.

12. The article of apparel according to claim 11, wherein an applicator applies the pressure to the uncompressed spacer element.

13. An article of apparel formed from a textile, the textile comprising:
a generally continuous first textile portion; and
a discontinuous second textile portion comprising a plurality of spacer elements extending distally from the first textile portion on an inner side of said article of apparel, the plurality of spacer elements defining an array of spacer elements ordered in columns and rows with a plurality of intersecting elongated channels defined between the rows and columns, the plurality of spacer elements including a plurality of expanded spacer elements oriented in spaced relation from a plurality of compressed spacer elements, wherein said elongated channels define a gaps between the
wherein the plurality of spacer elements includes an expanded spacer elements and the compressed spacer elements, the compressed spacer elements being secured in a compressed state by a sealing agent comprising a binder and $SiO_2$ heat retaining material, wherein the sealing agent covers both a portion of said first textile portion and a number of said compressed spacer elements on said discontinuous second textile portion.

14. The article of apparel according to claim 13, wherein the compressed spacer elements are flattened by pressure.

15. The article of apparel according to claim 13, wherein each of the compressed spacer elements is formed by applying pressure to one of the expanded spacer elements.

16. The article of apparel according to claim 15, wherein an applicator applies the pressure to the one of the expanded spacer elements.

17. The article of apparel according to claim 13, wherein the compressed spacer elements comprise compressed yarns, the sealing agent securing the compressed yarns in their compressed state.

* * * * *